US012619136B2

(12) United States Patent
Yamamoto

(10) Patent No.: US 12,619,136 B2
(45) Date of Patent: May 5, 2026

(54) DISPLAY APPARATUS SUPPORTING STAND AND PROJECTION SYSTEM

(71) Applicant: SEIKO EPSON CORPORATION, Tokyo (JP)

(72) Inventor: Akihiko Yamamoto, Yamagata-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 422 days.

(21) Appl. No.: 18/172,570

(22) Filed: Feb. 22, 2023

(65) Prior Publication Data

US 2023/0266649 A1 Aug. 24, 2023

(30) Foreign Application Priority Data

Feb. 22, 2022 (JP) ................................. 2022-025692

(51) Int. Cl.
*G03B 21/14* (2006.01)
*G03B 21/16* (2006.01)

(52) U.S. Cl.
CPC ......... *G03B 21/145* (2013.01); *G03B 21/142* (2013.01); *G03B 21/16* (2013.01)

(58) Field of Classification Search
CPC ..... G03B 21/145; G03B 21/142; G03B 21/16
USPC ........................................................ 353/119
See application file for complete search history.

(56) References Cited

U.S. PATENT DOCUMENTS

| | | | |
|---|---|---|---|
| 2005/0030494 A1* | 2/2005 | Kumai ................. | G03B 21/145 |
| | | | 348/E5.142 |
| 2013/0010268 A1 | 1/2013 | Nishima et al. | |
| 2023/0063232 A1* | 3/2023 | Shimoma ........... | H05K 7/20145 |
| 2023/0266647 A1* | 8/2023 | Yamamoto ........... | G03B 21/145 |
| | | | 353/119 |
| 2023/0266649 A1* | 8/2023 | Yamamoto ............. | G03B 21/00 |
| | | | 353/119 |

FOREIGN PATENT DOCUMENTS

| | | | |
|---|---|---|---|
| JP | 2005-010391 A | 1/2005 | |
| JP | 2009244795 A * | 10/2009 | |
| JP | 2013-033209 A | 2/2013 | |
| JP | 2018072803 A | 5/2018 | |
| WO | WO-2006070869 A1 * | 7/2006 | ............. F16M 11/10 |

* cited by examiner

*Primary Examiner* — Toan Ton
(74) *Attorney, Agent, or Firm* — Dority & Manning, P.A.

(57) ABSTRACT

A display apparatus supporting stand includes a fixing part configured to fix a display apparatus including a vent hole used for ventilation, and a plate material configured to support the fixing part in at least one of a first posture and a second posture. The plate material includes a first region opposed to the vent hole of the display apparatus when the display apparatus is fixed to the fixing part and the fixing part is in the first posture. The plate material includes a second region opposed to the vent hole of the display apparatus when the display apparatus is fixed to the fixing part and the fixing part is in the second posture. The plate material includes a first opening in the first region. The plate material includes a second opening in the second region.

6 Claims, 9 Drawing Sheets

DISPLAY APPARATUS SUPPORTING STAND AND PROJECTION SYSTEM

The present application is based on, and claims priority from JP Application Serial Number 2022-025692, filed Feb. 22, 2022, the disclosure of which is hereby incorporated by reference herein in its entirety.

BACKGROUND

1. Technical Field

The present disclosure relates to a display apparatus supporting stand and a projection system.

2. Related Art

There has been known a projector that optically projects projection light onto a projection surface. There has been proposed an attachment member to which such a projector is attached to enable a posture of the projector to be manually adjusted (JP2018-72803A (Patent Literature 1)).

However, in the attachment member disclosed in Patent Literature 1 described above, the periphery of the projector is surrounded in a box shape by a base member made of a plate material. Therefore, heat exhaust of the projector cannot be efficiently performed.

SUMMARY

According to an aspect of the present disclosure, there is provided a display apparatus supporting stand including: a fixing part configured to fix a display apparatus including a vent hole used for ventilation; and a plate material configured to support the fixing part in at least one of a first posture and a second posture. The plate material includes a first region opposed to the vent hole of the display apparatus when the display apparatus is fixed to the fixing part and the fixing part is in the first posture. The plate material includes a second region opposed to the vent hole of the display apparatus when the display apparatus is fixed to the fixing part and the fixing part is in the second posture. The plate material includes a first opening in the first region. The plate material includes a second opening in the second region.

According to an aspect of the present disclosure, there is provided a projection system including: the display apparatus supporting stand described above; and the display apparatus. The display apparatus is a projector that projects projection light.

BRIEF DESCRIPTION OF THE DRAWINGS

FIG. 7 is a side view at the time when the fixing part is fixed between the first posture and the second posture in FIG. 4.

Figure 9:
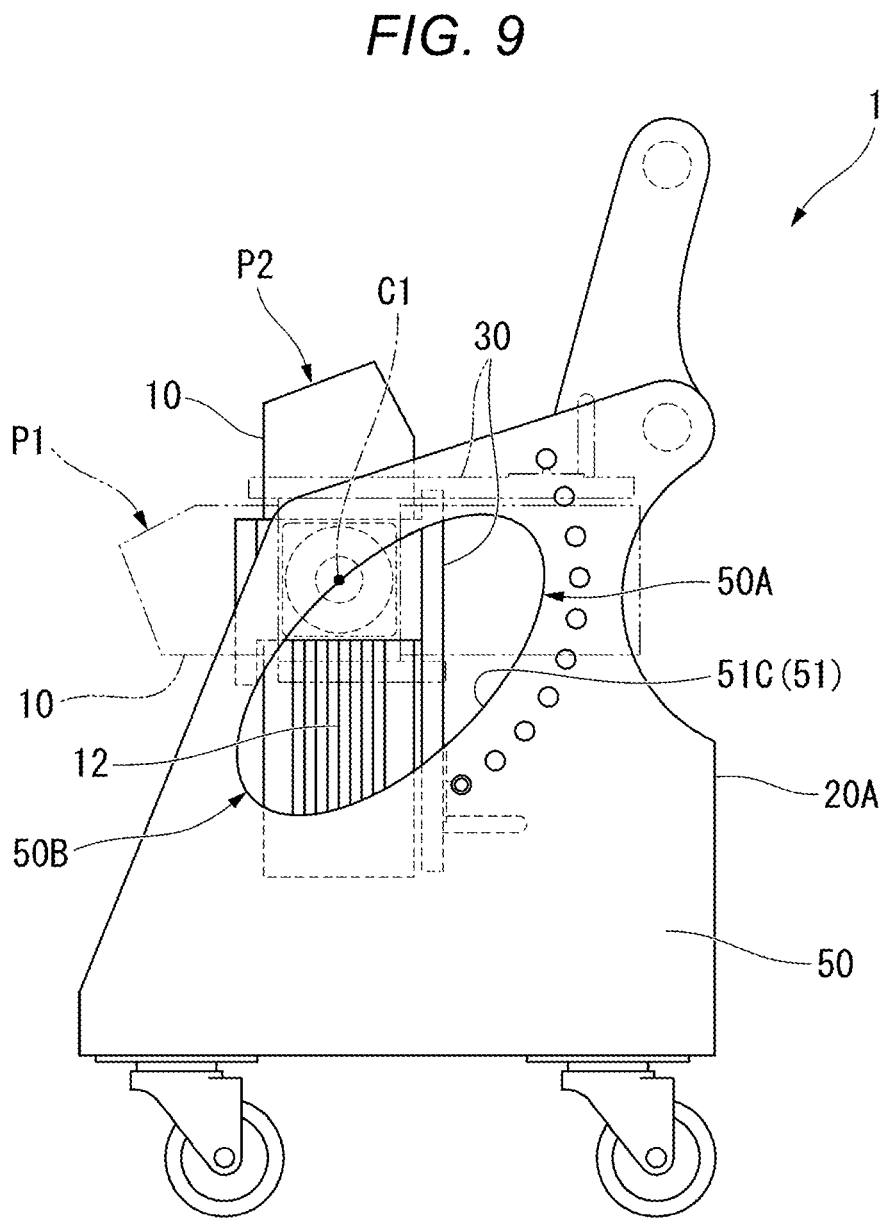

FIG. 9 is a side view showing a configuration of a supporting stand according to a modification and is a diagram corresponding to FIG. 4.

DESCRIPTION OF EXEMPLARY EMBODIMENTS

Figure 1:
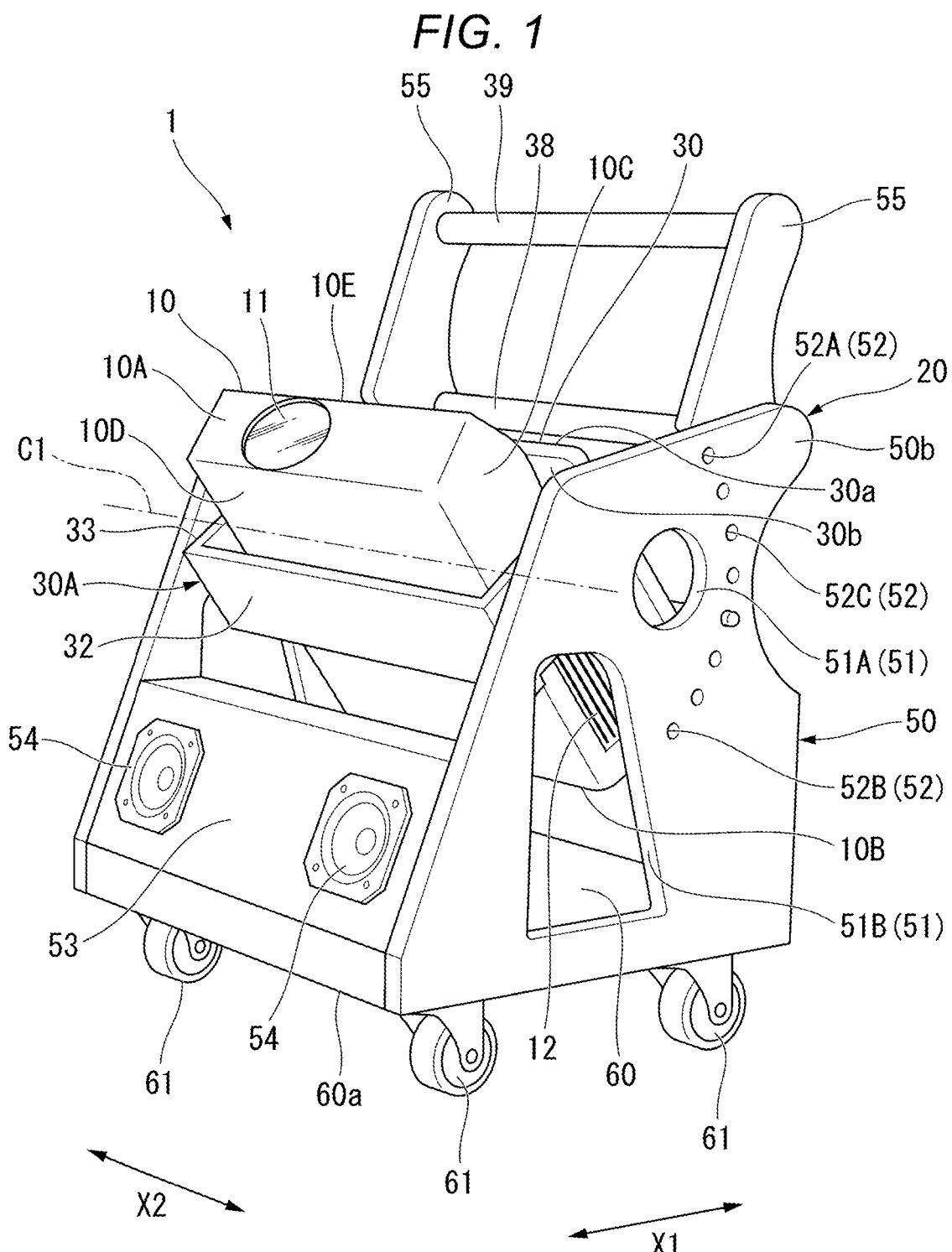
FIG. 1 is a perspective view of a projection system according to an embodiment viewed from an oblique front.

An embodiment of the present disclosure is explained below with reference to the drawing.

Note that, in the drawings referred to below, in order to clearly show components, some components are shown in different scales of dimensions.

Figure 2:
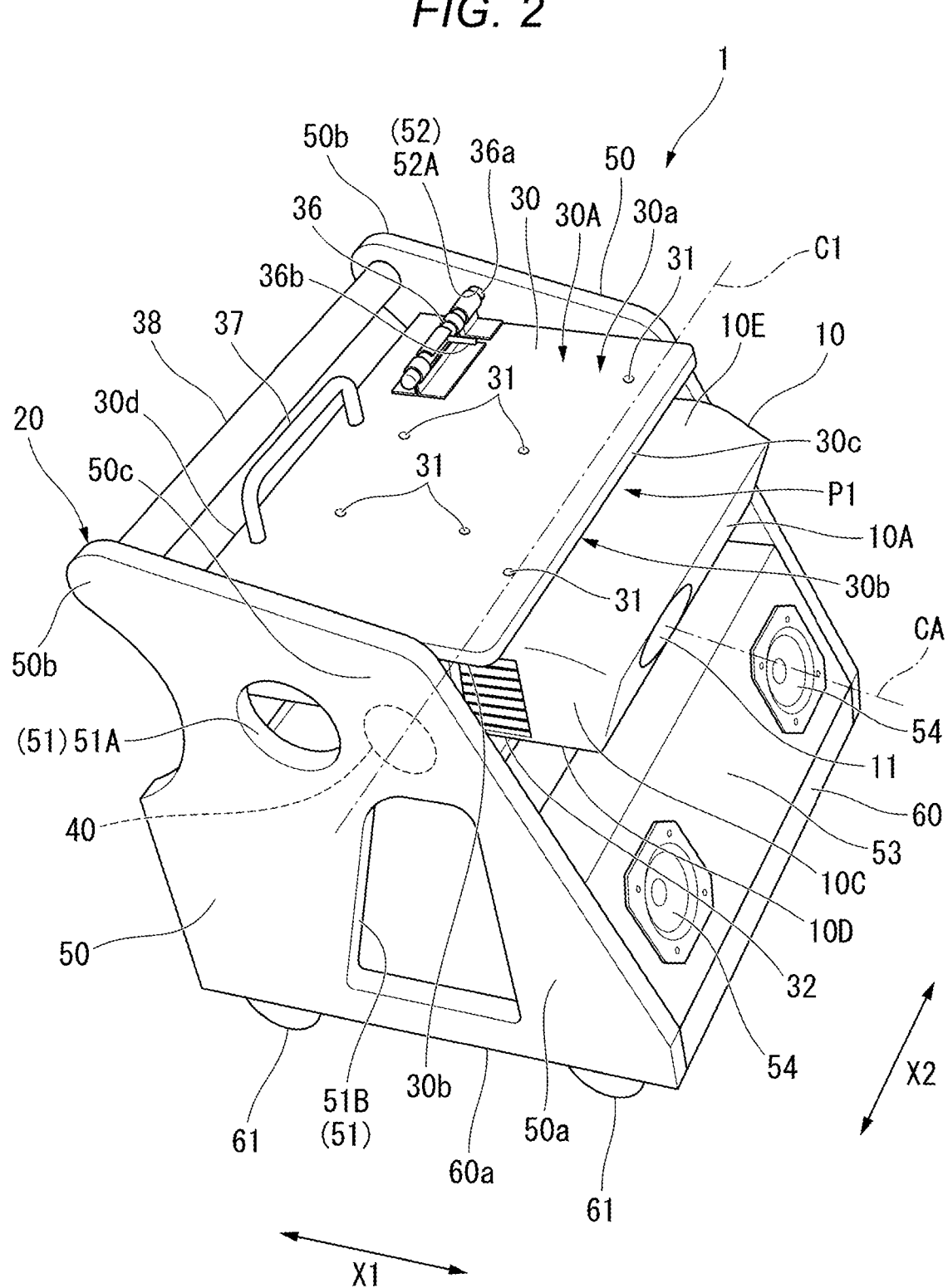
FIG. 2 is a perspective view of the projection system viewed from an oblique front at another angle.
Figure 3:
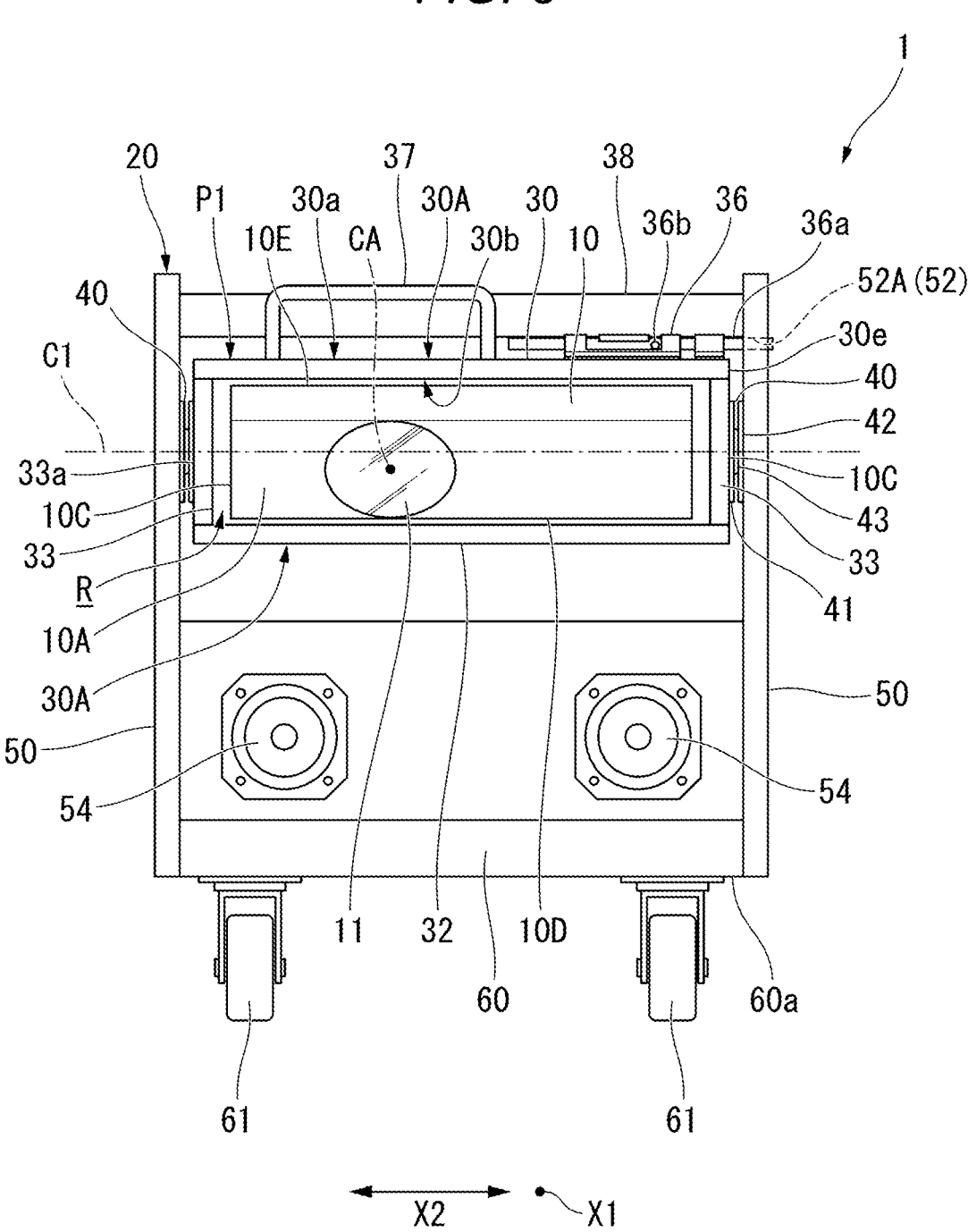
FIG. 3 is a front view of the projection system viewed from the front.
Figure 4:
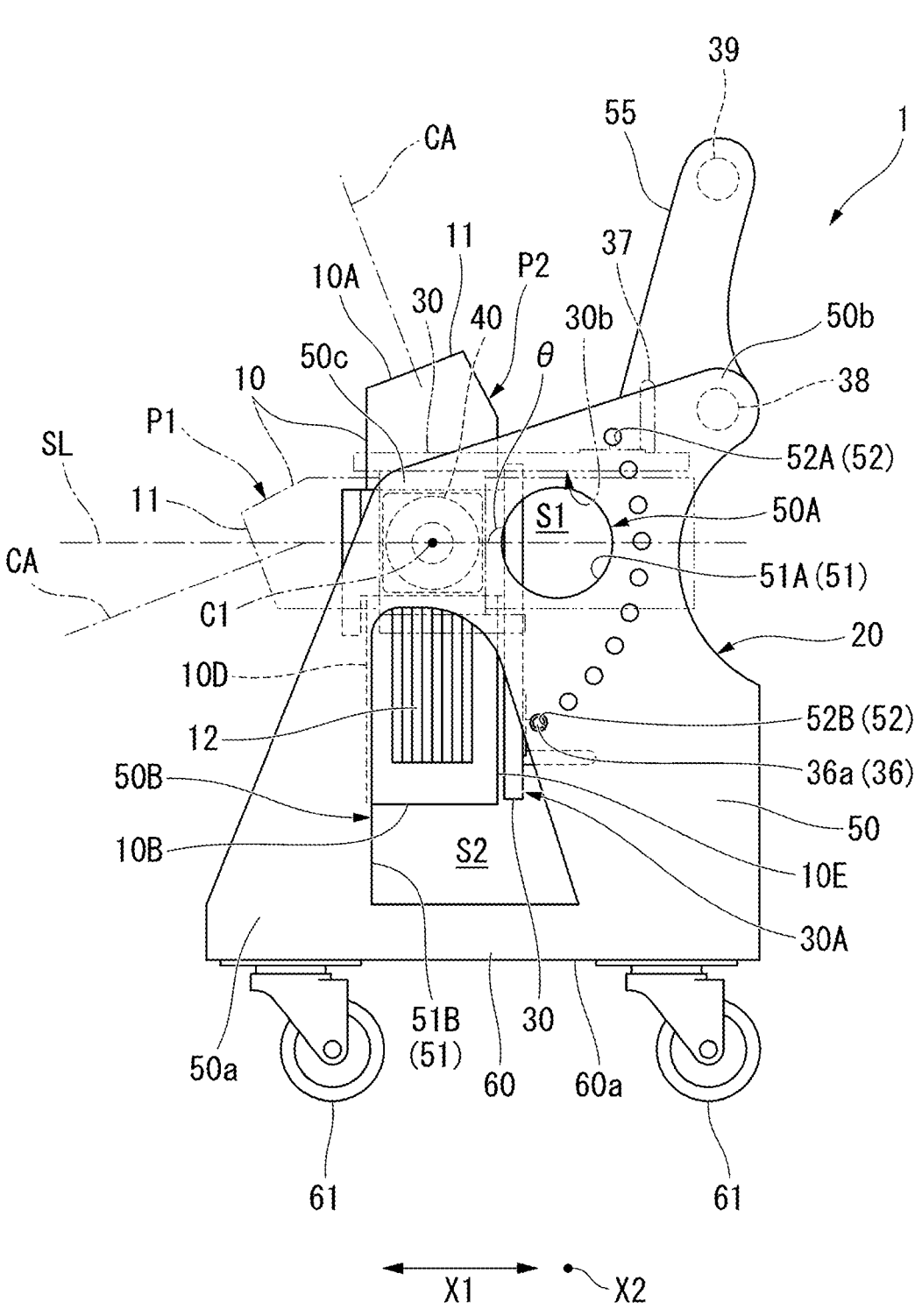
FIG. 4 is a side view of the projection system in which a side surface plate including an engaging hole is viewed from a side.

FIG. 1 is a perspective view of a projection system 1 including a display apparatus supporting stand, to which a projector 10 is attached, according to the embodiment viewed from an oblique front. FIG. 2 is a perspective view of the projection system 1 viewed from an oblique front at another angle. FIG. 3 is a front view of the projection system 1 viewed from the front. FIG. 4 is a side view of the projection system 1 in which a side surface plate including engaging holes is viewed from a side. The projection system 1 in this embodiment includes the projector 10 (a display apparatus) that projects projection light and a supporting stand 20 (the display apparatus supporting stand) on which the projector 10 can be set.

The projector 10 set in the supporting stand 20 can be carried by moving the supporting stand 20 with, for example, human power. That is, the supporting stand 20 is used when, only by moving the supporting stand 20 to a desired position, projection light is projected onto, for example, a screen or a wall surface such as a ceiling surface or a side surface in a room by the projector 10 on the supporting stand 20 without replacing the projector 10 from the supporting stand 20 to another place.

In the projector 10, a direction in which a projection lens 11 is disposed is referred to as front or a front side. A surface located on the front side in a housing of the projector 10 is referred to as a front surface. The projector 10 includes a front surface 10A, a rear surface 10B, a pair of side surfaces 10C, 10C, an upper surface 10D, and a lower surface 10E. In the projector 10, the rear surface 10B is a surface opposite to the front surface 10A. A direction in which the rear surface 10B is disposed is referred to as rear or a rear side.

Figure 5:
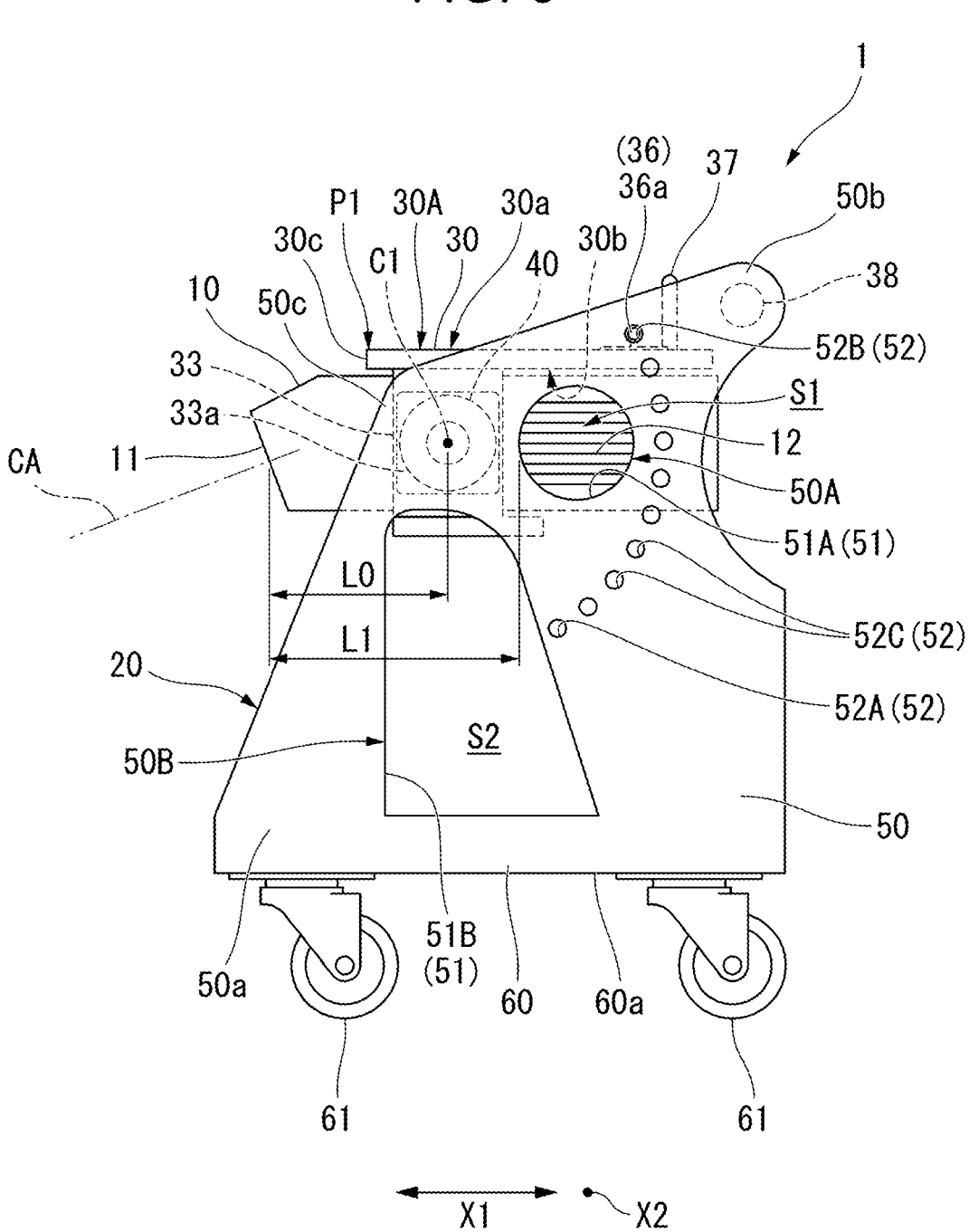
FIG. 5 is a side view at the time when a fixing part is in a first posture in FIG. 4.
Figure 6:
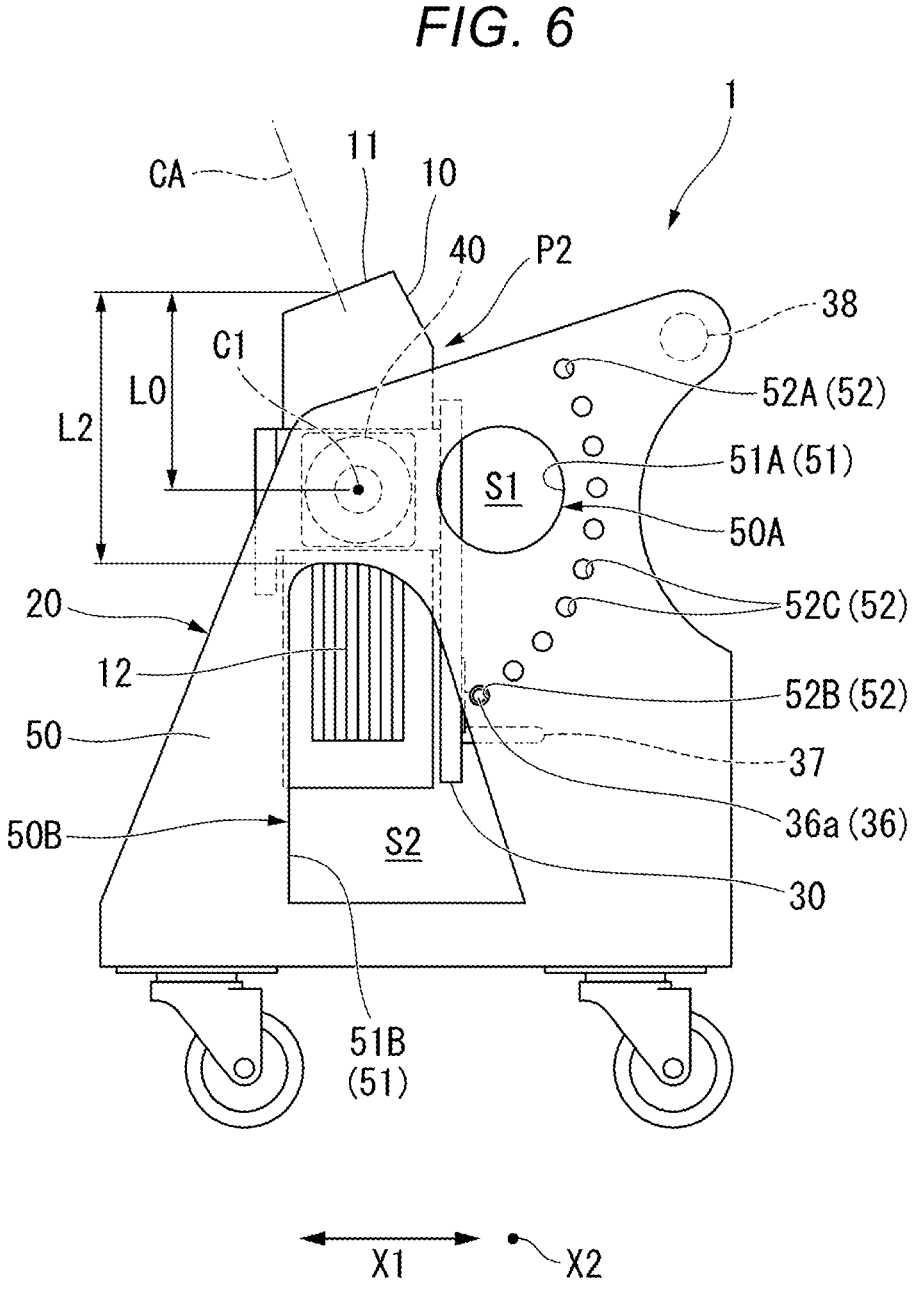
FIG. 6 is a side view at the time when the fixing part is in a second posture in FIG. 4.
Figure 7:
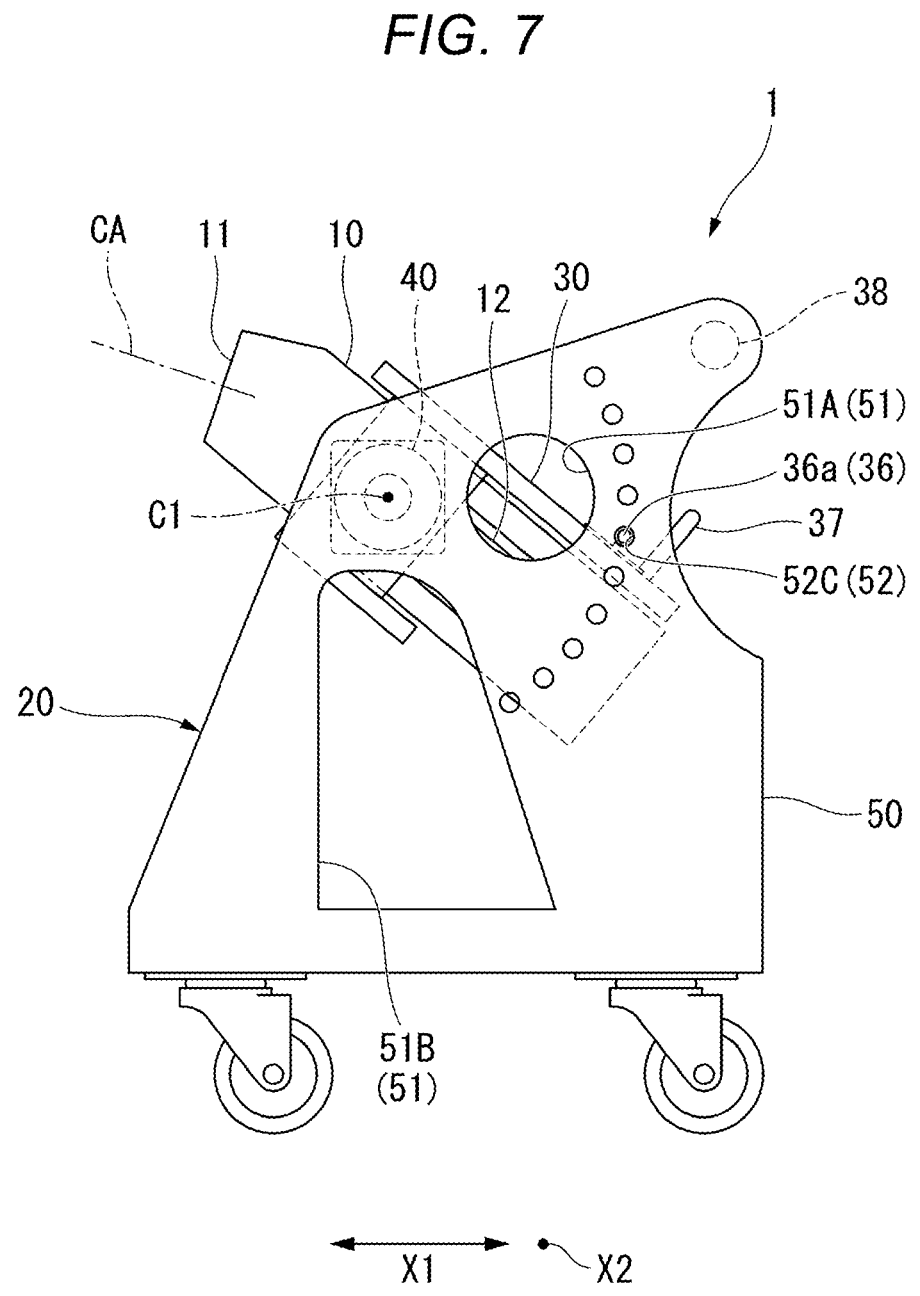

FIG. 5 is a side view at the time when a fixing part 30 is in a first posture P1. FIG. 6 is a side view at the time when the fixing part 30 is in a second posture P2. FIG. 7 is a side view at the time when the fixing part 30 is fixed between the first posture P1 and the second posture P2. The projection lens 11 is disposed on the front surface 10A. As shown in FIGS. 5 and 6, an exhaust port 12 (an air vent) used for exhaust (ventilation) is provided in a rear side portion of at least one of a pair of left and right side surfaces 10C. Not-shown intake ports used for suction (ventilation) are provided in the side surfaces 10C. The size of the exhaust port 12 is a region from substantially the center to a rear portion in a front-rear direction X1 of the side surfaces 10C. A shape, an area, and a position of the exhaust port 12 of the projector 10 are not limited to this embodiment.

A plurality of screw holes (not shown) for attaching the projector 10 to the fixing part 30 are formed in appropriate positions in the lower surface 10E of the projector 10.

Positions and the number of the screw holes of the projector 10 are not limited to this embodiment either.

As shown in FIGS. 2 and 3, the supporting stand 20 includes the fixing part 30 having a plate shape that fixes the projector 10, rotating shaft members 40 that support the fixing part 30 to be rotatable from the first posture P1 to the second posture P2, a pair of side surface plates 50 (plate materials) that supports the fixing part 30 rotatably via the rotating shaft members 40 at least in the first posture P1 and the second posture P2 that is at a rotation angle different from a rotation angle in the first posture P1, and a base stand 60 that includes wheels 61 and supports the side surface plates 50 from a lower side in a vertical direction.

In the supporting stand 20, at the time of the first posture P1 in which the fixing part 30 explained below is set horizontal in a top view, a direction orthogonal to a rotation axis C1 of rotation by the rotating shaft members 40 is represented as front-rear direction X1, a direction in which the projection lens 11 of the projector 10 is disposed in the front-rear direction X1 is referred to front or a front side, and the opposite side of the direction is referred to rear or a rear side. A direction along the rotation axis C1 is referred to as a left-right direction X2 and a direction circling around the rotation axis C1 is referred to as a circumferential direction.

The fixing part 30 is supported to be rotatable in the circumferential direction from the first posture P1 to the second posture P2 with respect to the pair of side surface plates 50. The fixing part 30 is formed in a plate shape having a fixed thickness and includes a first surface 30a and a second surface 30b that is the opposite surface of the first surface 30a. When the fixing part 30 is in the first posture P1 in which the fixing part 30 is horizontal, the first surface 30a faces upward in the vertical direction and the second surface 30b faces downward in the vertical direction.

As shown in FIG. 2, the projector 10 can be attached to the second surface 30b of the fixing part 30 by fixing screws 31. The projector 10 is attached to the fixing part 30 in a state in which the lower surface 10E is directed to the second surface 30b. That is, as shown in FIG. 3, the projector 10 is attached in a suspended state from the fixing part 30 in the first posture P1 in which the projector 10 is in a horizontal position and is attached in a state in which the projector 10 is top-bottom inverted, that is, a state in which the upper surface 10D of the projector 10 is facing downward in the vertical direction. The front surface 10A including the projection lens 11 of the projector 10 is provided in a state in which the front surface 10A is further protruded forward than a front end 30c of the fixing part 30 when the projector 10 is attached to the fixing part 30.

Screw holes (not shown) through which the fixing screws 31 can be inserted from the first surface 30a side are provided in the fixing part 30 to pierce through the fixing part 30 in the thickness direction thereof. The positions of the screw holes of the fixing part 30 are set in positions corresponding to screw holes (not shown) formed in the lower surface 10E of the projector 10 attached to the second surface 30b. That is, in the supporting stand 20, since the fixing screws 31 are screwed into a plurality of screw holes of the lower surface 10E of the projector 10 from the first surface 30a side of the fixing part 30, the projector 10 is fixed in a predetermined position of the fixing part 30.

As shown in FIG. 5, the first posture P1 in the fixing part 30 is a posture in a position where the first surface 30a and the second surface 30b of the fixing part 30 are horizontal. When the fixing part 30 is in the first posture P1, the projector 10 is attached to the second surface 30b of the fixing part 30 such that an axial direction of a projection axis CA faces an obliquely downward direction with respect to a horizonal direction SL. When the fixing part 30 is in the first posture P1, projection light T1 (see FIG. 8) of the projector 10 is projected onto the side surface (the front surface) of the room.

As shown in FIG. 4, the second posture P2 in the fixing part 30 is a posture in which a surface direction of the first surface 30a and the second surface 30b of the fixing part 30 is in a position where a rotation angle θ with respect to the horizonal direction SL is 90 degrees in a posture in which the fixing part 30 rotates in the circumferential direction such that the axial direction of the projection axis CA tilts further upward in the vertical direction than the horizontal. When the fixing part 30 is in the second posture P2, projection light T2 (see FIG. 8) of the projector 10 is projected onto the ceiling surface of the room.

As shown in FIG. 3, an auxiliary plate 32 is provided in the fixing part 30 to be spaced apart from the second surface 30b. The auxiliary plate 32 is supported by a pair of left and right coupling plates 33 extending from both sides in the left-right direction X2 of the second surface 30b of the fixing part 30 in a direction separating from the the second surface 30b to thereby be fixed to the fixing part 30. A separation dimension between the second surface 30b of the fixing part 30 and the auxiliary plate 32 is set to be larger than at least a height dimension of the projector 10. An internal space R surrounded by the fixing part 30, the auxiliary plate 32, and the pair of coupling plates 33 is a housing region for the projector 10 attached to the second surface 30b of the fixing part 30. Since both sides in the front-rear direction X1 of the internal space R communicate with the outside, when the projector 10 is attached to and detached from the fixing part 30, the projector 10 can be inserted into and pulled out from the internal space R from the front side or the rear side.

As shown in FIG. 5, the coupling plates 33 are disposed in a position close to the front end 30c of the fixing part 30. On outer surfaces 33a (see FIG. 3) on outer sides in a left-right direction of the coupling plates 33, the rotating shaft members 40 interposed between the outer surfaces 33a and the side surface plates 50 and serving as the rotation axis C1 of the fixing part 30 are provided. That is, the coupling plates 33 coupled to the fixing part 30 rotate centering on the rotation axis C1 according to rotation of the rotating shaft members 40. The fixing part 30, the auxiliary plate 32, and the coupling plates 33 are referred to as a fixing unit 30A according to necessity.

As shown in FIG. 3, the rotating shaft members 40 include first rotating plates 41 coupled to the coupling plates 33 of the fixing unit 30A, second rotating plates 42 provided coaxially with the first rotating plates 41 and coupled to the side surface plates 50, and bearings 43 that are rotated around a center axis between the first rotating plates 41 and the second rotating plates 42. The rotating shaft members 40 are provided on both left and right sides of the fixing unit 30A. The rotating shaft members 40 on both the left and right sides are disposed coaxially with the rotation axis C1.

As shown in FIGS. 2 to 5, the side surface plates 50 are disposed on both the left and right sides across the fixing unit 30A in the left-right direction X2. The side surface plates 50 are configured from plate-like members and provided in a range in which the side surface plates 50 cover, from both the left and right sides, at least the exhaust port 12 of the projector 10 located in a rotation region from the first posture P1 to the second posture P2 in the fixing part 30. The pair of side surface plates 50 are disposed in parallel to each other in a state in which respective plate surfaces thereof cross the rotation axis C1 at a right angle in a top view. The side surface plates 50 are formed such that front lower end portions 50a project forward in a side view and rear upper end portions 50b are further on an upper side in the vertical direction than front upper end portions 50c. Lower ends of the side surface plates 50 are coupled to the base stand 60.

In the supporting stand 20 in this embodiment, a front plate member 53 that couples the respective front lower end portions 50a of the pair of side surface plates 50 in the left-right direction X2 and faces a forward front is provided. Two speakers 54 are provided in the front plate member 53. The speakers 54 output voice according to an image projected by the projector 10.

The base stand 60 is a plate-like member extending horizontally and couples and supports the lower ends of the pair of left and right side surface plates 50. Four wheels 61 are provided on a lower surface 60a of the base stand 60. The supporting stand 20 can move on a floor with the wheels 61.

As shown in FIGS. 4 to 6, in the pair of side surface plates 50, openings 51 (51A and 51B) are respectively provided in a first position 50A opposed to the exhaust port 12 of the projector 10 when the fixing part 30 is in the first posture P1 and a second position 50B opposed to the exhaust port 12 of the projector 10 when the fixing part 30 is in the second posture P2 in a state in which the projector 10 is fixed to the fixing part 30.

As shown in FIG. 5, a first opening 51A is formed in a circular shape in a side view and is disposed on a rear side of the rotation axis C1 (the rotating shaft members 40). When the fixing part 30 is in the first posture P1, the exhaust port 12 of the projector 10 is exposed in the left-right direction X2 from the first opening 51A and the exhaust port 12 and a space on an outer surface side of the side surface plate 50 communicate through the first opening 51A.

As shown in FIG. 6, a second opening 51B is formed in a substantially trapezoidal shape, a lower side of which is longer than an upper side thereof, in a side view and is disposed on the lower side in the vertical direction of the rotation axis C1 (the rotating shaft members 40). When the fixing part 30 is in the second posture P2, the exhaust port 12 of the projector 10 is exposed in the left-right direction X2 from the second opening 51B and the exhaust port 12 and the space on the outer surface side of the side surface plate 50 communicate through the second opening 51B. A second opening area S2 of the second opening 51B provided in the second position 50B of the side surface plate 50 is larger than a first opening area S1 of the first opening 51A provided in the first position 50A of the side surface plate 50.

As shown in FIG. 7, when the fixing part 30 is in a posture in which the fixing part 30 is fixed in a position of a rotation angle between the first posture P1 and the second posture P2, an opening is not formed in a position opposed to the exhaust port 12 of the projector 10. However, exhaust is performed using the first opening 51A and the second opening 51B disposed near the exhaust port 12 at this time. Alternatively, even when the fixing part 30 is in the posture in which the fixing part 30 is fixed in the position of the rotation angle between the first posture P1 and the second posture P2, the openings 51A and 51B may be set such that at least a part of the exhaust port 12 of the projector 10 is exposed to at least one of the first opening 51A and the second opening 51B.

As shown in FIG. 5, when the fixing part 30 is in the first posture P1, a distance L0 from the projection lens 11 of the projector 10 to the rotation axis C1 is shorter than a distance L1 from the projection lens 11 to the first opening 51A. As shown in FIG. 6, when the fixing part 30 is in the second posture P2, the distance L0 from the projection lens 11 of the projector 10 to the rotation axis C1 is shorter than a distance L2 from the projection lens 11 to the second opening 51B.

As shown in FIGS. 1 and 4 to 6, in one of the pair of side surface plates 50, a plurality of circular engaging holes 52, 52, . . . are provided at a fixed interval in the circumferential direction along an arc centering on the rotation axis C1. The engaging holes 52 pierce through the side surface plate 50 in a thickness direction. Positions where the plurality of engaging holes 52 are disposed are positions overlapping a track on which a locking pin 36a of a locking stopper 36 shown in FIG. 2 provided in the fixing part 30 explained below rotates together with the fixing part 30. The plurality of engaging holes 52 are set in positions further on the rear side than the first opening 51A and the second opening 51B of the side surface plate 50, the positions not overlapping the first opening 51A and the second opening 51B. The locking pin 36a of the locking stopper 36 can change the fixing part 30 to a posture at a predetermined rotation angle and fix the fixing part 30 by selectively engaging in any one of the engaging holes 52.

Specifically, the engaging holes 52 include a first engaging hole 52A for fixing the fixing part 30 in the first posture P1, a second engaging hole 52B for fixing the fixing part 30 in the second posture P2, and a plurality of third engaging holes 52C between the first engaging hole 52A and the second engaging hole 52B. The third engaging holes 52C fix the fixing part 30 in postures that are at rotation angles between the first posture P1 and the second posture P2.

In this embodiment, the engaging holes 52 are provided only in one side surface plate 50. However, the engaging holes 52 may be provided in both of the pair of side surface plates 50. In this case, the engaging holes 52 on both the left and right sides are disposed to be coaxial on an axis parallel to the rotation axis C1. When the engaging holes 52 are provided in the side surface plates 50 on both the left and right sides in this way, the locking stopper 36 is also provided on each of both the left and right sides of the fixing part 30.

An interval in the circumferential direction of the engaging holes 52 adjacent to each other among the plurality of engaging holes 52 provided in one side surface plate 50 and the number of the plurality of engaging holes 52 can be optionally set. A rotation angle of the projector 10 attached to the fixing part 30 can be changed by changing the interval and the number. In this embodiment, the engaging holes 52 are through-holes that pierce through the side surface plate 50. However, the engaging holes 52 are not limited to be the through-holes and may be bottomed holes that do not pierce through the side surface plate 50.

As shown in FIG. 2, the supporting stand 20 includes, on the first surface 30a of the fixing part 30, the locking stopper 36 including the locking pin 36a capable of projecting in both side directions in the rotation axis C1 direction and a rotation operator 37 for rotating the fixing part 30.

The locking stopper 36 is disposed, in the rear of the first surface 30a of the fixing part 30, in a position close to one side surface plate 50 in which the engaging holes 52 are provided. The locking stopper 36 includes the locking pin 36a capable of moving in the left-right direction X2.

The locking pin 36a is provided to be capable of projecting outward from a side end 30e (see FIG. 3) of the fixing part 30 when viewed from a direction orthogonal to the first surface 30a of the fixing part 30. The locking pin 36a can be manually operated to move forward and backward with a pin operation member 36b protruding outward from a part of the locking pin 36a. The locking pin 36a is capable of selectively engaging in any one of the plurality of engaging holes 52 provided in the side surface plate 50. The fixing part 30 is fixed in a posture at a rotation angle at the time when the locking pin 36*a* engages. When the locking pin 36*a* is pulled out from the engaging hole 52, the fixing part 30 can be rotated in the circumferential direction around the rotation axis C1.

As shown in FIG. 2, the rotation operator 37 is provided in a position close to a rear end 30*d* of the first surface 30*a* of the fixing part 30. The rotation operator 37 is formed in a C shape and made of a bar-like member and projects from the first surface 30*a* at height not interfering with a first gripping member 38 explained below when the fixing part 30 is rotated.

Figure 8:
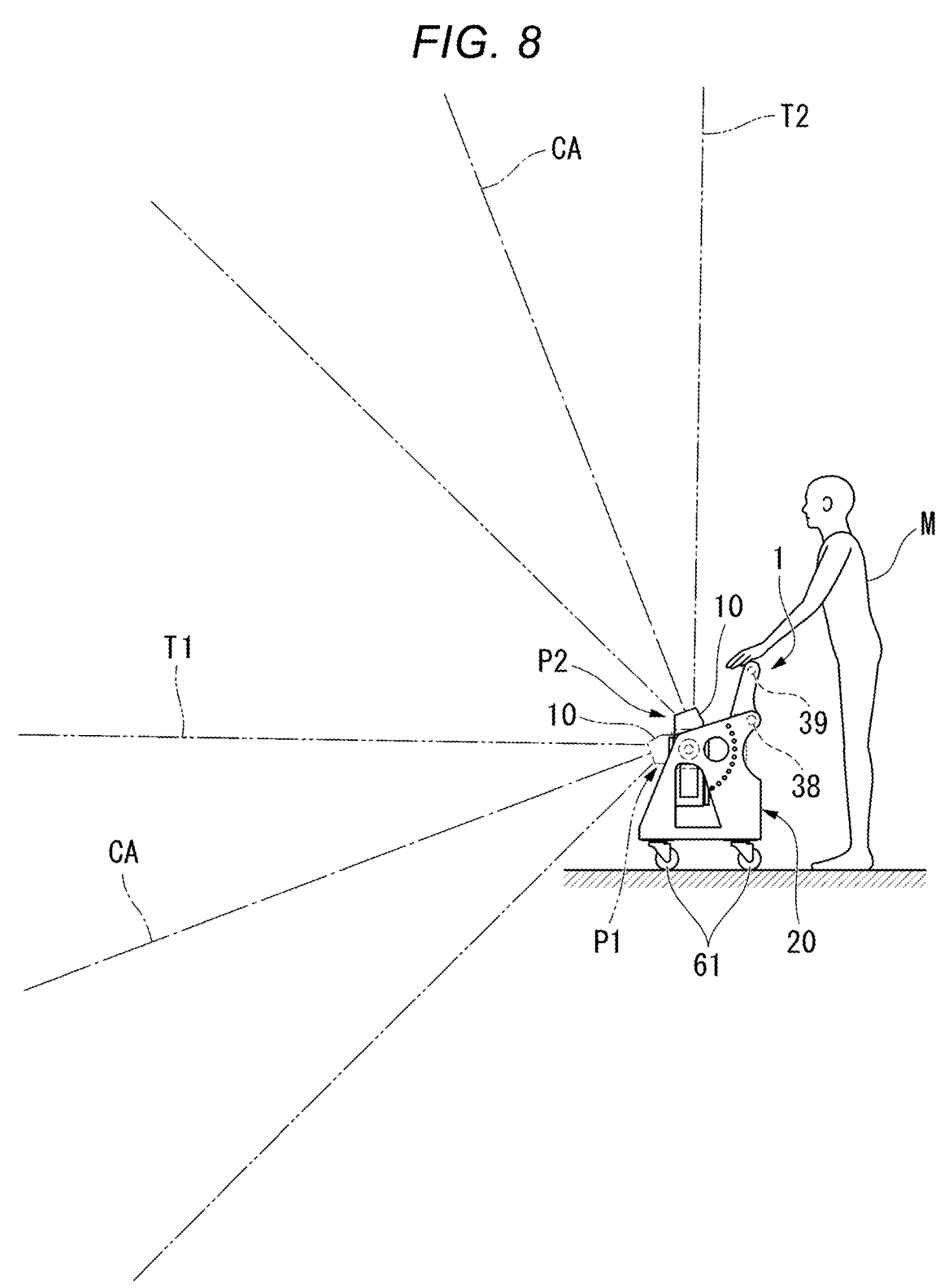
FIG. 8 is a diagram showing ranges of projection lights at the time when the fixing part is in the first posture and the second posture.

As shown in FIG. 1, the first gripping member 38 and a detachable second gripping member 39 located further on the upper side in the vertical direction than the first gripping member 38 are provided in a rear portion of the supporting stand 20. The first grasping member 38 and the second grasping member 39 are hand-holdable bar-like members extending in the left-right direction X2. FIGS. 1, 4, and 8 are diagrams showing a state in which the second gripping member 39 is attached. FIGS. 2, 3, 5, 6, and 7 are diagrams showing a state in which the second gripping member 39 is detached.

As shown in FIGS. 2 and 4, the first gripping member 38 is fixed in a state in which the first gripping member 38 is coupled to the rear upper end portions 50*b* of the pair of side surface plates 50 in the left-right direction X2. The first grasping member 38 is disposed on the opposite side of the first surface 30*a* across the fixing screws 31 provided on the first surface 30*a* of the fixing part 30 that is in the second posture P2. As explained above, the first gripping member 38 is provided in a position where the first gripping member 38 avoids the rotation operator 37 when the fixing part 30 is rotated in the circumferential direction.

As shown in FIGS. 1 and 4, at the rear upper end portion 50*b* of each of the pair of side surface plates 50, an arm member 55 extending from the rear upper end portion 50*b* toward the upper side in the vertical direction is detachably provided. The second gripping member 39 is fixed to a pair of arm members 55 in a state in which upper ends of the arm members 55 are coupled in the left-right direction X2. That is, the second gripping member 39 is located further on the upper side in the vertical direction than the first gripping member 38. When an operator M moves the supporting stand 20 as shown in FIG. 8, the operator M can move the supporting stand 20 by holding the first gripping member 38 and the second gripping member 39.

Action of the supporting stand 20 is explained.

The supporting stand 20 in this embodiment includes the fixing part 30 configured to fix the projector 10 including the exhaust port 12 used for ventilation and the side surface plate 50 that supports the fixing part 30 at least in the first posture P1 and the second posture P2. In the side surface plate 50, the first opening 51A and the second opening 51B are provided, in a state in which the projector 10 is fixed to the fixing part 30, respectively in the first position 50A opposed to the exhaust port 12 of the projector 10 when the fixing part 30 is in the first posture P1 and the second position 50B opposed to the exhaust port 12 of the projector 10 when the fixing part 30 is in the second posture P2. Therefore, in this embodiment, when the fixing part 30 to which the projector 10 is fixed is in the first posture P1, the exhaust port 12 of the projector 10 is in a position opposed to one first opening 51A. When the fixing part 30 is in the second posture P2, the exhaust port 12 of the projector 10 is in a position opposed to the other second opening 51B. In this embodiment, since the first opening 51A and the second opening 51B are provided in the side surface plate 50 in this way, ventilation by suction and exhaust can be performed for the projector 10 adjusted to the postures P1 and P2. In particular, exhaust heat of the projector 10 does not stagnate in a region surrounded by the fixing part 30 and the side surface plate 50 that support the projector 10. Heat exhaust of the projector 10 can be efficiently performed. Even when the fixing part 30 is in a posture that is a position between the first posture P1 and the second posture P2, it is possible to perform ventilation for the projector 10 using the first opening 51A and the second opening 51B located near the projector 10.

In this embodiment, the fixing part 30 is supported to be rotatable from the first posture P1 to the second posture P2 with respect to the side surface plate 50. The plate surface of the side surface plate 50 crosses the rotation axis C1 of the fixing part 30. In this embodiment, since the fixing part 30 rotates centering on the rotation axis C1 with respect to the side surface plate 50 in this way, it is possible to adjust the projector 10 fixed to the fixing part 30 to a posture at any rotation angle. At this time, the openings 51 provided in the side surface plate 50 are concentratedly arranged in positions in the circumference direction around the rotation axis C1. The openings 51 of the side surface plate 50 are arranged not only in positions opposed to the exhaust port 12 of the projector 10 fixed at any angle but also in positions near the exhaust port 12. Therefore, it is possible to efficiently perform ventilation in all postures in the fixing part 30.

In this embodiment, the projector 10 is the projector 10 that projects projection light. The fixing part 30 is capable of fixing the projector 10 such that the projection light is projected in a direction crossing the rotation axis C1. In this case, since the projector 10 can be rotated around the rotation axis C1 with respect to the side surface plate 50, it is possible to efficiently project the projection light of the projector 10, for example, in a range of rotation angles from the horizontal direction SL to the upward direction in the vertical direction.

In the supporting stand 20 according to this embodiment, the fixing part 30 includes the first surface 30*a*. The first posture P1 is a posture in a position where the first surface 30*a* is horizontal. The second posture P2 is a posture in a position to which the fixing part 30 rotates 90 degrees with respect to the horizontal direction SL such that the projection axis CA of the projector 10 tilts further upward in the vertical direction than the horizontal. The second opening area S2 of the second opening 51B provided in the second position 50B is larger than the first opening area S1 of the first opening 51A provided in the first position 50A. In this case, exhaust efficiency is the highest in the first posture P1 in which the projector 10 is set in the horizontal direction SL and decreases in the second posture P2 in which the projector 10 is directed perpendicularly to the horizontal direction SL. However, since the second opening area S2 of the second opening 51B opposed to the exhaust port 12 of the projector 10 at the time of the second posture P2 is set larger than the first opening area S1 of the first opening 51A, it is possible to efficiently perform ventilation even in the second posture P2.

In this embodiment, the projector 10 includes the projection lens 11 that projects projection light. When the fixing part 30 is in the first posture P1, the distance L0 from the projection lens 11 of the projector 10 to the rotation axis C1 is shorter than the distance L1 from the projection lens 11 to the first opening 51A. In this case, since the rotation axis C1 is closer to the projection lens 11 side than the first opening 51A, a rotation amount (a rotation distance) on the projection lens 11 side at the rotation time of the projector 10 decreases. It is possible to suppress vibration to a projection optical system.

In this embodiment, the projector 10 includes the projection lens 11 that projects projection light. When the fixing part 30 is in the second posture P2, the distance L0 from the projection lens 11 of the projector 10 to the rotation axis C1 is shorter than the distance L2 from the projection lens 11 to the second opening 51B. In this case, since the rotation axis C1 is closer to the projection lens 11 side than the second opening 51B, a rotation amount (a rotation distance) on the projection lens 11 side at the rotation time of the projector 10 decreases. It is possible to suppress vibration to the projection optical system.

In this embodiment, the projection system 1 includes the supporting stand 20 described above and the display apparatus. The display apparatus is the projector 10 that projects projection light.

According to at least one embodiment explained above, it is possible to perform heat exhaust of the projector 10 attached to be capable of adjusting a posture.

Several embodiments of the present disclosure are explained above. However, these embodiments are presented as examples and are not intended to limit the scope of the invention. These embodiments can be implemented in other various forms. Various omissions, substitutions, and changes can be made without departing from the gist of the invention. These embodiments and modifications thereof are included in the scope and the gist of the invention and are also included in the inventions described in the claims and the scope of equivalents of the inventions.

In the embodiment explained above, the display apparatus is the projector 10. However, the display apparatus is not limited to the projector 10 and may be a display apparatus such as an FPD (flat panel display).

The plate materials only have to cross the rotation axis around which the fixing part rotates. Therefore, the surface direction of the side surface plates 50 may not be orthogonal to the rotation axis C1 unlike in this embodiment.

In this embodiment, the plate materials in which the openings 51 are provided are the side surface plates 50 disposed on both the sides in the left-right direction X2 across the fixing part 30 (the projector 10). However, the plate materials are not limited to the side surface plates 50. For example, when the exhaust port 12 of the projector 10 is provided in the rear surface 10B or the upper surface 10D, a rear surface plate or a bottom surface plate (equivalent to the base stand 60 in this embodiment) may be provided on the rear side of the supporting stand 20 and an opening may be provided in the rear surface plate or the bottom surface plate. In short, the plate materials are not limited to the side surface plates 50.

The openings provided in the plate material are not limited to the configuration in which one opening (the first opening 51A or the second opening 51B) is provided in each of the first posture P1 and the second posture P2 as in the embodiment explained above. For example, the opening may be a set of a large number of holes. Alternatively, the opening may be one opening (a third opening 51C) including both portions 50C opposed to the exhaust ports 12 of the projector 10 in the positions of the first posture P1 and the second posture P2. The third opening 51C in a modification is formed to be opposed to a track of the exhaust port 12 of the projector 10 that rotates around the rotation axis C1. Therefore, even if the projector 10 is fixed in a posture at any rotation angle from the first posture P1 to the second posture P2, since the exhaust port 12 is opposed to the third opening 51C, it is possible to perform sure ventilation.

A display apparatus supporting stand according to an aspect of the present disclosure may have the following configuration.

The display apparatus supporting stand according to the aspect of the present disclosure includes: a fixing part configured to fix a display apparatus including a vent hole used for ventilation; and a plate material configured to support the fixing part at least in a first posture and a second posture. In the plate material, openings are provided, in a state in which the display apparatus is fixed to the fixing part, respectively in a first position opposed to the vent hole of the display apparatus when the fixing part is in the first posture and a second position opposed to the vent hole of the display apparatus when the fixing part is in the second posture.

In the display apparatus supporting stand according to the aspect of the present disclosure, the fixing part may be supported to be rotatable from the first posture to the second posture with respect to the plate material, and a plate surface of the plate material may cross a rotation axis of the fixing part.

In the display apparatus supporting stand according to the aspect of the present disclosure, the display apparatus may be a projector that projects projection light, and the fixing part may fix the projector such that the projection light is projected in a direction crossing the rotation axis.

In the display apparatus supporting stand according to the aspect of the present disclosure, the first posture may be a horizontal posture, the second posture may be a posture in which the fixing part rotates further upward than a horizontal to be at a right angle with respect to a horizontal direction, a second opening area of a second opening provided in the second position may be larger than a first opening area of a first opening provided in the first position.

In the display apparatus supporting stand according to the aspect of the present disclosure, the display apparatus may include a projection lens that projects projection light, and, when the fixing part is in the first posture, a distance from the projection lens of the display apparatus to the rotation axis may be shorter than a distance from the projection lens to the first opening.

In the display apparatus supporting stand according to the aspect of the present disclosure, the display apparatus may include a projection lens that projects projection light, and, when the fixing part is in the second posture, a distance from the projection lens of the display apparatus to the rotation axis may be shorter than a distance from the projection lens to the second opening.

A projection system according to an aspect of the present disclosure may have the following configuration.

The projection system according to the aspect of the present disclosure includes: the display apparatus supporting stand according to the aspect of the present disclosure; and the display apparatus. The display apparatus is a projector that projects projection light.

What is claimed is:

1. A display apparatus supporting stand comprising:
   a fixing plate configured to fix a display apparatus including a vent hole used for ventilation wherein the display apparatus is a projector that projects a projection light and the projector is fixed to the fixing plate wherein the fixing plate has a first surface; and
   a side surface plate configured to support the fixing plate in at least one of a first posture and a second posture, wherein the side surface plate includes a first region opposed to the vent hole of the display apparatus when the display apparatus is fixed to the fixing plate and the fixing plate is in the first posture, the side surface plate includes a second region opposed to the vent hole of the display apparatus when the display apparatus is fixed to the fixing plate and the fixing plate is in the second posture, wherein the side surface plate includes a first opening in the first region, and the side surface plate includes a second opening in the second region the fixing plate is supported to be rotatable from the first posture to the second posture with respect to the side surface plate, a plate surface of the side surface plate crosses a rotation axis of the fixing plate, the projector projects the projection light in a direction crossing the rotation axis, the first surface is horizontal when the fixing plate is in the first posture, the fixing plate rotates 90 degrees with respect to a horizontal direction when the fixing plate is the second posture, an axial direction of a projection axis of the projector tilts further upward than a horizontal in the second posture, and a second opening area of the second opening provided in the second region is larger than a first opening area of the first opening provided in the first region.

2. The display apparatus supporting stand according to claim 1, wherein the display apparatus includes a projection lens that projects projection light, and when the fixing plate is in the first posture, a distance from the projection lens of the display apparatus to the rotation axis is shorter than a distance from the projection lens to the first opening.

3. The display apparatus supporting stand according to claim 1, wherein the display apparatus includes a projection lens that projects projection light, and when the fixing plate is in the second posture, a distance from the projection lens of the display apparatus to the rotation axis is shorter than a distance from the projection lens to the second opening.

4. A projection system comprising:

a display apparatus wherein the display apparatus is a projector that projects a projection light wherein the projector projects the projection light using a projection lens;

a display apparatus supporting stand comprising:

a fixing plate configured to fix a display apparatus including a vent hole used for ventilation wherein the fixing plate has a first surface; and a side surface plate configured to support the fixing plate in at least one of a first posture and a second posture, wherein the side surface plate includes a first region opposed to the vent hole of the display apparatus when the display apparatus is fixed to the fixing plate and the fixing plate is in the first posture, the side surface plate includes a second region opposed to the vent hole of the display apparatus when the display apparatus is fixed to the fixing plate and the fixing plate is in the second posture, wherein the side surface plate includes a first opening in the first region, and the side surface plate includes a second opening in the second region the fixing plate is supported to be rotatable from the first posture to the second posture with respect to the side surface plate, a plate surface of the side surface plate crosses a rotation axis of the fixing plate, the projector projects the projection light in a direction crossing the rotation axis, the first surface is horizontal when the fixing plate is in the first posture, the fixing plate rotates 90 degrees with respect to a horizontal direction when the fixing plate is the second posture, an axial direction of a projection axis of the projector tilts further upward than a horizontal in the second posture, and a second opening area of the second opening provided in the second region is larger than a first opening area of the first opening provided in the first region.

5. The projection system according to claim 4, wherein when the fixing plate is in the first posture, a distance from the projection lens of the display apparatus to the rotation axis is shorter than a distance from the projection lens to the first opening.

6. The projection system according to claim 4, wherein when the fixing plate is in the second posture, a distance from the projection lens of the display apparatus to the rotation axis is shorter than a distance from the projection lens to the second opening.

* * * * *